US010197718B2

(12) United States Patent
Choi et al.

(10) Patent No.: US 10,197,718 B2
(45) Date of Patent: Feb. 5, 2019

(54) ADHESIVE FILM FOR POLARIZING PLATE, ADHESIVE COMPOSITION FOR POLARIZING PLATE FOR THE SAME, POLARIZING PLATE COMPRISING THE SAME AND OPTICAL DISPLAY COMPRISING THE SAME (71) Applicant: SAMSUNG SDI CO., LTD., Yongin-si, Gyeonggi-do (KR)

(72) Inventors: Ju Yeol Choi, Suwon-si (KR); Seung Hoon Lee, Suwon-si (KR); Seung Jun Lee, Suwon-si (KR); In Cheon Han, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 15/364,157

(22) Filed: Nov. 29, 2016

(65) Prior Publication Data

US 2017/0152413 A1    Jun. 1, 2017

(30) Foreign Application Priority Data

Nov. 30, 2015  (KR) .................. 10-2015-0169419

(51) Int. Cl.
  *C09J 133/08* (2006.01)
  *G02B 5/30* (2006.01)
  *C09J 133/06* (2006.01)

(52) U.S. Cl.
  CPC .......... *G02B 5/305* (2013.01); *C09J 133/066* (2013.01); *C08L 2312/00* (2013.01)

(58) Field of Classification Search
  None
  See application file for complete search history.

(56) References Cited

U.S. PATENT DOCUMENTS

| | | | |
|---|---|---|---|
| 9,175,193 B2 * | 11/2015 | Kim | ................ C09J 7/0246 |
| 2008/0200587 A1 | 8/2008 | Filiatrault et al. | |
| 2009/0116111 A1 * | 5/2009 | Toyama | ................ C09J 7/0246 |
| | | | 359/580 |
| 2010/0227969 A1 * | 9/2010 | Zhu | ............ C07D 203/18 |
| | | | 524/560 |
| 2011/0116022 A1 * | 5/2011 | Jang | ................ C09J 133/066 |
| | | | 349/96 |
| 2011/0236605 A1 * | 9/2011 | Hattori | ............ C08G 18/10 |
| | | | 428/1.55 |
| 2013/0029135 A1 | 1/2013 | Kim et al. | |
| 2017/0145262 A1 * | 5/2017 | Nam | .................. C09J 7/00 |

FOREIGN PATENT DOCUMENTS

| | | |
|---|---|---|
| CN | 102015939 A | 4/2011 |
| CN | 101646739 B | 3/2012 |
| EP | 2 557 136 A2 | 2/2013 |
| JP | 5738967 B2 | 6/2015 |
| KR | 10-2014-0085299 A | 7/2014 |
| KR | 10-2014-0148278 A | 12/2014 |
| KR | 10-2015-0090762 A | 8/2015 |
| KR | 10-2015-0108320 A | 9/2015 |

OTHER PUBLICATIONS

Reference: Polymer Properties, Polymer Products From Aldrich, (Year: 2017).*
Taiwan Office action in corresponding Taiwan Application No. 105139160, Taiwan Office action dated Oct. 6, 2017 (7 pgs.).
China Office action dated Apr. 3, 2018 in corresponding Chinese Patent Application No. 201611076250.9 (6 pgs.).

* cited by examiner

*Primary Examiner* — Anish P Desai
(74) *Attorney, Agent, or Firm* — Lewis Roca Rothgerber Christie LLP (57) ABSTRACT An adhesive film for polarizing plates, an adhesive composition for polarizing plates, a polarizing plate including the same, and an optical display including the same are provided. An adhesive film for polarizing plates is formed of an adhesive composition including: a (meth)acrylic copolymer including a hydroxyl group and a carboxylic acid group; a bifunctional aziridine curing agent; and an isocyanate curing agent, and has an adhesive strength of about 2,500 gf/25 mm or more.

18 Claims, 2 Drawing Sheets

ADHESIVE FILM FOR POLARIZING PLATE, ADHESIVE COMPOSITION FOR POLARIZING PLATE FOR THE SAME, POLARIZING PLATE COMPRISING THE SAME AND OPTICAL DISPLAY COMPRISING THE SAME

CROSS-REFERENCE TO RELATED APPLICATION

This application claims priority to and the benefit of Korean Patent Application No. 10-2015-0169419, filed on Nov. 30, 2015 in the Korean Intellectual Property Office, the entire content of which is incorporated herein by reference.

BACKGROUND

1. Field

Aspects of embodiments of the present invention relate to an adhesive film for polarizing plates, an adhesive composition for polarizing plates, a polarizing plate comprising the same, and an optical display including the same.

2. Description of the Related Art

A liquid crystal display includes a liquid crystal panel and polarizing plates attached to both surfaces of the liquid crystal panel. Each of the polarizing plates includes a polarizer and a protective film formed on one or both surfaces of the polarizer to protect the polarizer. The polarizing plate is attached to the liquid crystal panel via an adhesive film for polarizing plates.

An adhesive film for polarizing plates is required to have good adhesive strength to a protective film. An adhesive film exhibiting poor adhesion is vulnerable to shrinkage and/or expansion of a polarizing plate when the polarizing plate is exposed to high temperature and/or high humidity conditions, thereby causing poor image quality of a liquid crystal display. In addition, the adhesive film for polarizing plates is required to suppress detachment of the polarizing plate from a liquid crystal cell and generation of bubbles under high temperature and/or high humidity conditions. The adhesive film for polarizing plates must satisfy each of high adhesive strength to protective films, good durability, and high peel strength.

The adhesive film for polarizing plates is produced by coating an adhesive composition to a predetermined thickness, followed by aging the adhesive composition. Generally, aging is performed at room temperature (for example, 23° C.) for about 3 days to 7 days. In order to reduce the aging period, aging may be performed at a constant temperature of 35° C. In this case, however, a separate aging room is required. Moreover, since the adhesive film is cut after aging at room temperature (for example, 23° C.), even in the case where aging is performed at a constant temperature, there is a problem of deterioration in productivity. Moreover, the adhesive composition can suffer from increase in viscosity in a blended state before coating, thereby causing deterioration in process stability.

The background technique of the present invention is disclosed in Japanese Patent No. 5,738,967.

SUMMARY

According to an aspect of embodiments of the present invention, an adhesive film for polarizing plates exhibits high adhesive strength to a protective film, good durability, and high peel strength under high temperature and/or high humidity conditions.

In accordance with one or more embodiments of the present invention, an adhesive film for polarizing plates is formed of an adhesive composition including: a (meth) acrylic copolymer including a hydroxyl group and a carboxylic acid group; a bifunctional aziridine curing agent; and an isocyanate curing agent, and has an adhesive strength of about 2,500 gf/25 mm or greater.

In accordance with one or more embodiments of the present invention, an adhesive composition for polarizing plates includes: a (meth)acrylic copolymer including a hydroxyl group and a carboxylic acid group; a bifunctional aziridine curing agent; and an isocyanate curing agent, and the adhesive composition has a gel fraction difference of about 5% or less, as calculated by the following Equation 1:

Gel fraction difference=$A-B$, where A and B are defined herein.

In accordance with one or more embodiments of the present invention, a polarizing plate includes the adhesive film for polarizing plates as set forth above, or an adhesive film formed of the adhesive composition for polarizing plates as described above.

In accordance with one or more embodiments of the present invention, an optical display includes an adhesive film for polarizing plates or a polarizing plate as described above.

DETAILED DESCRIPTION

Hereinafter, embodiments of the present invention will be described in further detail with reference to the accompanying drawings to enable those skilled in the art to easily practice the present invention. It should be understood that the present invention may be embodied in different ways and is not limited to the following embodiments. In the drawings, portions irrelevant to the description will be omitted for clarity. Like components will be denoted by like reference numerals throughout the specification.

Herein, spatially relative terms such as "upper" and "lower" are defined with reference to the accompanying drawings. Thus, it will be understood that "upper surface" can be used interchangeably with "lower surface."

Herein, the terms "adhesive film for polarizing plates" and "adhesive composition for polarizing plates" can be simply represented by the terms "adhesive film" and "adhesive composition," respectively.

Herein, the term "(meth)acryl" refers to acryl and/or methacryl.

Herein, "room temperature" may mean a temperature of about 23° C. to about 25° C.

Figure 1:
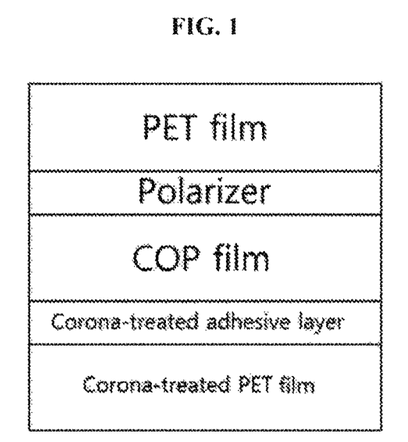
FIG. 1 is a schematic sectional view of a specimen for measurement of adhesive strength.

Herein, "adhesive strength" means a degree of adhesion of an adhesive film to a polyethylene terephthalate (PET) film and may be measured as follows. For preparation of a specimen for measurement of adhesive strength as shown in FIG. 1, a protective film for polarizing plates is attached to one surface of an adhesive film for polarizing plates, the other surface of the adhesive film is subjected to corona treatment, and then a corona-treated surface of the PET film is attached to a corona-treated surface of the adhesive film to form a stack structure of PET film (thickness: about 20 μm to about 100 μm)/polarizer (thickness: about 5 μm to about 30 μm)/cyclic olefin polymer (COP) film (thickness: about 40 μm to about 80 μm)/corona-treated adhesive layer (thickness: about 10 μm to about 30 μm)/corona-treated PET film (thickness: about 80 μm to about 100 μm). The specimen is left at about 25° C. for about 1 day or about 7 days. Thereafter, with the corona-treated adhesive layer and the corona-treated PET film of the specimen coupled to upper and lower jigs of a texture analyzer, the corona-treated adhesive layer is peeled at about 180° from the corona-treated PET film at a tensile speed of about 300 mm/min under a load cell of 30 kgf. Adhesive strength of the adhesive film is defined as peel strength at which the corona-treated adhesive layer is peeled off the corona-treated PET film. Here, the specimen of FIG. 1 has a size of about 25 mm×about 180 mm, and the adhesive layer or the PET film is subjected to corona treatment once at about 60 doses.

Figure 5A:
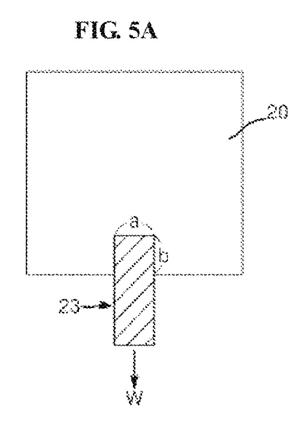
FIGS. 5A and 5B are schematic diagrams illustrating measurement of creep from a front view and a partial side view, respectively.
Figure 5B:
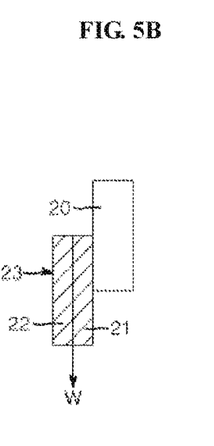

Herein, "creep" means a pushed distance, as measured by the following method. Referring to FIGS. 5A and 5B, a specimen 23 for measurement of creep is attached in an area of a×b (for example, 15 mm×15 mm) to a distal end of a soda lime glass plate 20 and pulled by a weight W for 1,000 seconds, followed by measuring a pushed distance of the specimen 23 from the soda lime glass plate 20. The specimen 23 includes an adhesive film 21 and a polarizing plate 22 formed on the adhesive film 21. The polarizing plate 22 includes a triacetylcellulose film, a polarizer, and a triacetylcellulose film stacked in the stated order. Creep can be measured using a Texture Analyzer TA.XT Plus (load cell 5 kg, EKO Instruments). Creep can be measured with respect to an adhesive layer (dried product of an adhesive composition) obtained by coating the adhesive composition on a release film (PET film). Further, creep can be measured with respect to an adhesive layer (adhesive film) obtained by coating the adhesive composition, followed by drying and aging at about 23° C. and about 45% RH (relative humidity) for about 1 day. Here, the adhesive layer may have a thickness of about 10 μm to about 40 μm.

An adhesive film for polarizing plates according to an embodiment, and an adhesive composition for polarizing plates for the same are described below.

An adhesive film for polarizing plates according to an embodiment is formed of an adhesive composition that comprises: a (meth)acrylic copolymer including a hydroxyl group and a carboxylic acid group; a bifunctional aziridine curing agent; and an isocyanate curing agent.

The adhesive film for polarizing plates can exhibit high adhesive strength through reaction between the hydroxyl group and an isocyanate group of the isocyanate curing agent and reaction between the carboxylic acid group and an aziridine group of the bifunctional aziridine curing agent. That is, as described below, the adhesive film according to an embodiment is formed of the adhesive composition, which comprises a (meth)acrylic copolymer having specific amounts of the hydroxyl group and the carboxylic acid group, a specific amount of the bifunctional aziridine curing agent, and the isocyanate curing agent, thereby exhibiting high adhesive strength with respect to a protective film for polarizing plates. In an embodiment, the adhesive film may have an adhesive strength of about 2,500 gf/25 mm or greater, and, in one embodiment, about 2,500 gf/25 mm, 2,600 gf/25 mm, 2,700 gf/25 mm, 2,800 gf/25 mm, 2,900 gf/25 mm, 3,000 gf/25 mm, 3,100 gf/25 mm, 3,200 gf/25 mm, 3,300 gf/25 mm, 3,400 gf/25 mm, 3,500 gf/25 mm, 3,600 gf/25 mm, 3,700 gf/25 mm, 3,800 gf/25 mm, 3,900 gf/25 mm, 4,000 gf/25 mm, 4,100 gf/25 mm, 4,200 gf/25 mm, 4,300 gf/25 mm, 4,400 gf/25 mm, 4,500 gf/25 mm, 4,600 gf/25 mm, 4,700 gf/25 mm, 4,800 gf/25 mm, 4,900 gf/25 mm, or 5,000 gf/25 mm, as measured after being left at about 25° C. for about 1 day or about 7 days. In addition, the adhesive film for polarizing plates may have an adhesive strength in a range from one of the numerical values set forth above to another numerical value set forth above, as measured after being left at about 25° C. for about 1 day or about 7 days. For example, the adhesive film for polarizing plates may have an adhesive strength of about 2,500 gf/25 mm to about 5,000 gf/25 mm, as measured after being left at about 25° C. for about 1 day or about 7 days. Within this range, the adhesive film has high adhesive strength and good wettability with respect to a protective film, thereby improving durability of a polarizing plate while suppressing generation of bubbles when the adhesive film is attached to the protective film. The adhesive strength can be represented by AS1 or AS7. Herein, AS1 refers to a load upon peeling a corona-treated PET film of a specimen from a corona-treated adhesive layer thereof at 180° and at a tensile speed of 300 mm/min, in which the specimen is prepared by sequentially stacking a PET film/polarizer/COP film/adhesive layer formed by corona treatment of the adhesive film/corona-treated PET film and left at 25° C. for 1 day, and AS7 refers to a load upon peeling a corona-treated PET film of a specimen from a corona-treated adhesive layer thereof at 180° and at a tensile speed of 300 mm/min, in which the specimen is prepared by sequentially stacking a PET film/polarizer/COP film/adhesive layer formed by corona treatment of the adhesive film/corona-treated PET film and left at 25° C. for 7 days.

In addition, for the adhesive film for polarizing plates according to an embodiment of the present invention, a difference in adhesive strength (AS7–AS1) between after leaving for about 7 days and after leaving for about 1 day may be about 0 gf/25 mm, 10 gf/25 mm, 20 gf/25 mm, 30 gf/25 mm, 40 gf/25 mm, 50 gf/25 mm, 60 gf/25 mm, 70 gf/25 mm, 80 gf/25 mm, 90 gf/25 mm, 100 gf/25 mm, 110 gf/25 mm, 120 gf/25 mm, 130 gf/25 mm, 140 gf/25 mm, 150 gf/25 mm, 160 gf/25 mm, 170 gf/25 mm, 180 gf/25 mm, 190 gf/25 mm, 200 gf/25 mm, 210 gf/25 mm, 220 gf/25 mm, 230 gf/25 mm, 240 gf/25 mm, 250 gf/25 mm, 260 gf/25 mm, 270 gf/25 mm, 280 gf/25 mm, 290 gf/25 mm, 300 gf/25 mm, 310 gf/25 mm, 320 gf/25 mm, 330 gf/25 mm, 340 gf/25 mm, 350 gf/25 mm, 360 gf/25 mm, 370 gf/25 mm, 380 gf/25 mm, 390 gf/25 mm, 400 gf/25 mm, 410 gf/25 mm, 420 gf/25 mm, 430 gf/25 mm, 440 gf/25 mm, 450 gf/25 mm, 460 gf/25 mm, 470 gf/25 mm, 480 gf/25 mm, 490 gf/25 mm, or 500 gf/25 mm. In addition, for the adhesive film for polarizing plates, the difference in adhesive strength (AS7 -AS1) between after leaving for about 7 days and after leaving for about 1 day may be in a range from one of the numerical values set forth above to another numerical value set forth above. For example, for the adhesive film for polarizing plates, the difference in adhesive strength (AS7–AS1) between after leaving for about 7 days and after leaving for about 1 day may be about 500 gf/25 mm or less, and, in one embodiment, about 0 to about 300 gf/25 mm, and, in one embodiment, about 0 to about 260 gf/25 mm. Within this range, the adhesive film can reduce the aging period.

The adhesive film for polarizing plates may have a creep at about 23° C. of about 0 μm, 10 μm, 20 μm, 30 μm, 40 μm, 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, 200 μm, 210 μm, 220 μm, 230 μm, 240 μm, 250 μm, 260 μm, 270 μm, 280 μm, 290 μm, or 300 μm. In addition, the adhesive film for polarizing plates may have a creep at about 23° C. in a range from one of the numerical values set forth above to another numerical value set forth above. For example, the adhesive film for polarizing plates may have a creep at about 23° C. of about 300 μm or less, and, in one embodiment, about 120 μm to about 250 μm. Within this range, the adhesive film can control a cohesion failure phenomenon while exhibiting cohesion between adhesives, and can provide suitable increase in hardness.

The adhesive film for polarizing plates may have a peel strength of about 100 gf/25 mm, 110 gf/25 mm, 120 gf/25 mm, 130 gf/25 mm, 140 gf/25 mm, 150 gf/25 mm, 160 gf/25 mm, 170 gf/25 mm, 180 gf/25 mm, 190 gf/25 mm, 200 gf/25 mm, 210 gf/25 mm, 220 gf/25 mm, 230 gf/25 mm, 240 gf/25 mm, 250 gf/25 mm, 260 gf/25 mm, 270 gf/25 mm, 280 gf/25 mm, 290 gf/25 mm, 300 gf/25 mm, 310 gf/25 mm, 320 gf/25 mm, 330 gf/25 mm, 340 gf/25 mm, 350 gf/25 mm, 360 gf/25 mm, 370 gf/25 mm, 380 gf/25 mm, 390 gf/25 mm, 400 gf/25 mm, 410 gf/25 mm, 420 gf/25 mm, 430 gf/25 mm, 440 gf/25 mm, 450 gf/25 mm, 460 gf/25 mm, 470 gf/25 mm, 480 gf/25 mm, 490 gf/25 mm, or 500 gf/25 mm, as measured in accordance with JIS 2107. In addition, the adhesive film for polarizing plates may have a peel strength in a range from one of the numerical values set forth above to another numerical value set forth above, as measured in accordance with JIS 2107. For example, the adhesive film for polarizing plates may have a peel strength of about 100 gf/25 mm to about 500 gf/25 mm, and, in one embodiment, about 100 gf/25 mm to about 400 gf/25 mm, as measured in accordance with JIS 2107. Within this range, the adhesive strength can prevent or substantially prevent light leakage of a polarizing plate under high temperature conditions or under high temperature/high humidity conditions.

The adhesive film for polarizing plates is optically transparent and thus can be used for an optical display. In an embodiment, the adhesive film may have a light transmittance of about 85% or greater, and, in one embodiment, about 85% to about 99.9%, at a wavelength of about 380 nm to about 780 nm.

The adhesive film for polarizing plates may have a thickness of about 40 μm or less, and, in one embodiment, about 5 μm to about 30 μm. Within this range, the adhesive film may be used for an optical display.

The adhesive film for polarizing plates may be prepared by coating the adhesive composition to a thickness (e.g., a predetermined thickness), drying the adhesive composition (to volatize a solvent), and aging under conditions of room temperature and a relative humidity of about 40% to about 60% for about 1 day, followed by cutting. As such, the adhesive composition for polarizing plates allows reduction in aging period even under room temperature conditions and can secure good cuttability even after aging at room temperature for about 1 day.

Next, the adhesive composition for polarizing plates will be described in more detail.

The (meth)acrylic copolymer can form a matrix of the adhesive film for polarizing plates. In addition, the (meth) acrylic copolymer provides a specific amount of hydroxyl groups and a specific amount of carboxylic acid groups so as to reduce the aging period at room temperature through reaction with the bifunctional aziridine curing agent and the isocyanate curing agent while securing good cuttability even after aging at room temperature for about 1 day. Accordingly, the adhesive composition for polarizing plates may have a gel fraction difference of about 0%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, or 5.0%, as calculated by Equation 1 below. In addition, the adhesive composition for polarizing plates may have a gel fraction difference in a range from one of the numerical values set forth above to another numerical value set forth above, as calculated by Equation 1 below. For example, the adhesive composition for polarizing plates may have a gel fraction difference of about 5% or less, and, in one embodiment, about 0.1% to about 5%, and, in one embodiment, about 0.1% to about 2.0%, as calculated by Equation 1 below. Within this range, the adhesive composition has a low gel fraction difference between aging at room temperature for about 7 days and aging at room temperature for about 1 day, whereby the adhesive film can be advantageously used for a polarizing plate even after aging at room temperature for about 1 day, thereby providing an effect of reducing the aging period.

$$\text{Gel fraction difference} = A - B, \quad \text{Equation 1:}$$

where A is a gel fraction of the adhesive composition for polarizing plates after aging for 7 days, and B is a gel fraction of the adhesive composition for polarizing plates after aging for 1 day, as calculated by Equation 2:

$$\text{Gel fraction} = (Wb - Wa)/(Wc - Wa) \times 100,$$

where $Wa$ is the weight of a wire mesh of about 200 mesh, $Wb$ is the total weight (unit: g) of the wire mesh and about 0.5 g of an adhesive film wrapped by the wire mesh so as not to leak therefrom, in which the adhesive film is obtained by aging the adhesive composition at about 23° C. and 55% RH for a period (e.g., a predetermined period) of time, and $Wc$ is the total weight (unit: g) of the wire mesh and the adhesive film, in which the adhesive film wrapped by the wire mesh is completely dipped in a sample bottle containing 50 cc methylethylketone, left at about 23° C. for about 1 day, and dried at about 100° C. for about 12 hours.

The adhesive composition for polarizing plates may have a gel fraction (A) of about 70% or more, and, in one embodiment, about 70% to about 90%, as measured after aging at about 23° C. and about 55% RH for about 1 day. The adhesive composition for polarizing plates may have a gel fraction (B) of about 70% or more, and, in one embodiment, about 70% to about 90%, as measured after aging at about 23° C. and about 55% RH for about 7 days. Within this range, the adhesive film can be used for an optical display and can secure durability.

The (meth)acrylic copolymer may provide a specific amount of hydroxyl groups and a specific amount of carboxylic acid groups and may react with the bifunctional aziridine curing agent and the isocyanate curing agent, thereby improving viscosity stability by preventing or substantially preventing increase in viscosity. In an embodiment, the adhesive composition for polarizing plates may have a viscosity variation ratio of about 0%, 0.01%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, 7.5%, 7.6%, 7.7%, 7.8%, 7.9%, 8.0%, 8.1%, 8.2%, 8.3%, 8.4%, 8.5%, 8.6%, 8.7%, 8.8%, 8.9%, 9.0%, 9.1%, 9.2%, 9.3%, 9.4%, 9.5%, 9.6%, 9.7%, 9.8%, 9.9%, or less than 10.0%, as calculated by Equation 3 below. Further, the adhesive composition for polarizing plates may have a viscosity variation ratio in a range from one of the numerical values set forth above to another numerical value set forth above, as calculated by Equation 3 below. For example, the adhesive composition for polarizing plates may have a viscosity variation ratio of less than about 10%, and, in one embodiment, about 0.01% to about 8%, as calculated by Equation 3:

Viscosity variation ratio=$(D-C)/C \times 100$, where C is an initial viscosity (unit: cPs) of the adhesive composition at about 25° C., and D is the viscosity (unit: cPs) of the adhesive composition at 25° C., as measured after the adhesive composition is left at about 25° C. for about 24 hours.

The (meth)acrylic copolymer may be a (meth)acrylic copolymer that has a hydroxyl group, a carboxylic acid group, and an alkyl group. The (meth)acrylic copolymer may be a copolymer of a monomer mixture, for example, a random copolymer of the monomer mixture, which comprises a hydroxyl group-containing (meth)acrylic monomer, a carboxylic acid group-containing (meth)acrylic monomer, and an alkyl group-containing (meth)acrylic monomer. The (meth)acrylic copolymer can improve wettability of the adhesive composition together with the bifunctional aziridine curing agent and the isocyanate curing agent. Thus, a specimen obtained by coating the adhesive composition onto a release film and drying (solvent volatilization) without aging may have a creep at about 23° C. of about 1,000 μm, 1,100 μm, 1,200 μm, 1,300 μm, 1,400 μm, 1,500 μm, 1,600 μm, 1,700 μm, 1,800 μm, 1,900 μm, 2,000 μm, 2,100 μm, 2,200 μm, 2,300 μm, 2,400 μm, 2,500 μm, 2,600 μm, 2,700 μm, 2,800 μm, 2,900 μm, or 3,000 μm, as measured immediately after drying (solvent volatilization) without aging. In addition, the adhesive composition may have a creep at about 23° C. in a range from one of the numerical values set forth above to another numerical value set forth above, as measured immediately after drying (solvent volatilization) without aging. For example, the adhesive composition may have a creep at about 23° C. of about 1,000 μm or greater, and, in one embodiment, about 2,000 μm to about 3,000 μm, as measured immediately after drying (solvent volatilization) without aging. Creep is measured based on cohesive strength resulting from curing reaction of an adhesive, and the adhesive film is required to have a creep of about 1,000 μm or greater immediately after drying in order to provide good appearance by securing good wettability and preventing or substantially preventing generation of bubbles upon attachment to a polarizing plate. As described above, the adhesive composition according to the present invention has a creep of about 300 μm or less at about 23° C., as measured after aging at 23° C. and about 55% RH for about 1 day, and thus can be sufficiently cured by aging at room temperature (for example, at about 23°) and about 55% RH for about 1 day so as to be used as an adhesive composition for polarizing plates.

The hydroxyl group-containing (meth)acrylic monomer and the carboxylic acid group-containing (meth)acrylic monomer can react with the isocyanate curing agent and the bifunctional aziridine curing agent, respectively, thereby forming an adhesive film.

The hydroxyl group-containing (meth)acrylic monomer may react with the isocyanate curing agent to reduce the aging period. The hydroxyl group-containing (meth)acrylic monomer may include at least one of a (meth)acrylic monomer containing a $C_1$ to $C_{20}$ alkyl group having at least one hydroxyl group, a (meth)acrylic monomer containing a $C_3$ to $C_{20}$ cycloalkyl group having at least one hydroxyl group, and a (meth)acrylic monomer containing a $C_6$ to $C_{20}$ aromatic group having at least one hydroxyl group. In an embodiment, the hydroxyl group-containing (meth)acrylic monomer may include at least one selected from among 2-hydroxyethyl (meth)acrylate, 2-hydroxypropyl (meth)acrylate, 2-hydroxybutyl (meth)acrylate, 4-hydroxybutyl (meth)acrylate, 6-hydroxyhexyl (meth)acrylate, 1,4-cyclohexanedimethanol mono(meth)acrylate, 1-chloro-2-hydroxypropyl(meth)acrylate, diethylene glycol mono(meth)acrylate, 2-hydroxy-3-phenyloxypropyl (meth)acrylate, 4-hydroxycyclopentyl (meth)acrylate, and 4-hydroxycyclohexyl (meth)acrylate. These may be used alone or in combination thereof. The carboxylic acid group-containing (meth)acrylic monomer may include (meth)acrylic acid. The hydroxyl group-containing (meth)acrylic monomer may be present in an amount of about 0.1 wt % to about 5 wt %, and, in one embodiment, about 0.5 wt % to about 5 wt %, in the monomer mixture. Within this range, the adhesive composition has improved durability through reaction between the hydroxyl group and the curing agent, thereby preventing or substantially preventing detachment, slight lifting, and the like. The carboxylic acid group-containing (meth)acrylic monomer may be present in an amount of about 0.1 wt % to about 15 wt %, and, in one embodiment, about 0.1 wt % to about 5 wt %, in the monomer mixture. Within this range, the adhesive composition has improved durability through reaction between the carboxylic acid group and the curing agent, thereby preventing or substantially preventing detachment, slight lifting, and the like. In the monomer mixture, the hydroxyl group-containing monomer may be present in a lesser amount than the carboxylic acid group-containing monomer (in terms of wt %). Here, in consideration of the amounts of the bifunctional aziridine curing agent and the isocyanate curing agent, it is possible to secure desired properties of the adhesive film according to one or more embodiments of the present invention. In an embodiment, the hydroxyl group-containing monomer may be present in an amount of about 50 wt % or less, and, in one embodiment, about 45 wt % to about 50 wt %, in a monomer mixture comprising the hydroxyl group-containing monomer and the carboxylic acid group-containing monomer.

The alkyl group-containing (meth)acrylic monomer may include a mixture of alkyl group-containing (meth)acrylic monomers, homopolymers of which have different glass transition temperatures (Tg), in order to realize control of the glass transition temperature Tg and hardness improvement. In this mixture, a first alkyl group-containing (meth)acrylic monomer may be present in an excess amount relative to a second alkyl group-containing (meth)acrylic monomer. In an embodiment, relative to 100 parts by weight of the mixture, the first alkyl group-containing (meth)acrylic monomer may be present in an amount of about 55 parts by weight to about 95 parts by weight, and, in one embodiment, about 60 parts by weight to about 80 parts by weight, and the second alkyl group-containing (meth)acrylic monomer may be present in an amount of about 5 parts by weight to about 45 parts by weight, and, in one embodiment, about 20 parts by weight to about 40 parts by weight. Within this range, it is possible to achieve control of hardness and tack through increase in glass transition temperature (Tg). Accordingly, the adhesive film formed of the adhesive composition according to this embodiment may have a storage modulus at about 25° C. of about 0.05 MPa or greater, and, in one embodiment, about 0.05 MPa to about 0.5 MPa.

The first alkyl group-containing (meth)acrylic monomer may include at least one selected from among ethyl (meth) acrylate, n-propyl (meth)acrylate, n-butyl (meth)acrylate, isobutyl (meth)acrylate, pentyl (meth)acrylate, hexyl (meth) acrylate, 2-ethylhexyl (meth)acrylate, heptyl (meth)acrylate, octyl (meth)acrylate, isooctyl (meth)acrylate, nonyl (meth) acrylate, decyl (meth)acrylate, and dodecyl (meth)acrylate. A homopolymer of the first alkyl group-containing (meth) acrylic monomer may have a glass transition temperature of about 0° C. or less, and, in one embodiment, about −10° C. to about −100° C. The second alkyl group-containing (meth) acrylic monomer may include at least one of methyl (meth) acrylate, isopropyl (meth)acrylate, and t-butyl (meth)acrylate. These may be used alone or in combination thereof. A homopolymer of the second alkyl group-containing (meth) acrylic monomer may have a glass transition temperature of about 5° C. or greater, and, in one embodiment, about 5° C. to about 100° C.

In the monomer mixture, the alkyl group-containing (meth)acrylic monomer may be present in an amount of about 80 wt % to about 99 wt %, and, in one embodiment, about 90 wt % to about 99 wt %. Within this range, the adhesive composition can reduce haze of an adhesive layer while stabilizing pot life.

The (meth)acrylic copolymer may be prepared by typical polymerization of the monomer mixture. Polymerization of the monomer mixture may be performed by a typical method known in the art. For example, the (meth)acrylic copolymer may be prepared by adding an initiator to the monomer mixture, followed by typical polymerization of the monomer mixture, for example, suspension polymerization, emulsion polymerization, solution polymerization, and/or the like. Here, the polymerization may be performed at about 50° C. to about 70° C. for about 6 hours to about 10 hours. As the initiator, any typical initiator including azo-based polymerization initiators and/or peroxide polymerization initiators such as benzoyl peroxide or acetyl peroxide may be used.

The (meth)acrylic copolymer may have a weight average molecular weight (Mw) of about 2,000,000 g/mol or less, and, in one embodiment, about 800,000 g/mol to about 1,200,000 g/mol. Within this range, the (meth)acrylic copolymer can secure high durability of the adhesive film and allow rapid coating of the adhesive composition. The weight average molecular weight can be measured by gel permeation chromatography with a polystyrene standard. The (meth)acrylic copolymer may have a glass transition temperature of about −60° C. to about 0° C., and, in one embodiment, about −45° C. to about −5° C. Within this range, the (meth)acrylic copolymer can provide flowability to the adhesive film used as an adhesive while securing high durability of the adhesive film. The (meth)acrylic copolymer may have a polydispersion index of about 2.5 to about 9.0, and, in one embodiment, about 3 to about 6. Within this range, the (meth)acrylic copolymer allows stable polymerization while preventing or substantially preventing deterioration in durability. The (meth)acrylic copolymer may have an acid value of about 5.0 mgKOH/g or less, and, in one embodiment, about 0.01 mgKOH/g to about 3 mgKOH/g. Within this range, the (meth)acrylic copolymer can directly or indirectly suppress corrosion of an adherend.

The curing agent may include a mixture of the bifunctional aziridine curing agent and the isocyanate curing agent. The curing agent may be present in an amount of about 2 parts by weight or less, and, in one embodiment, about 0.01 parts by weight to about 1 part by weight, and, in one embodiment, about 0.01 parts by weight to about 0.5 parts by weight, relative to 100 parts by weight of the (meth) acrylic copolymer. Within this range, the adhesive composition can reduce the aging period while satisfying durability, and can exhibit high peel strength.

The bifunctional aziridine curing agent can cure the adhesive composition through reaction with the carboxylic acid group of the (meth)acrylic copolymer. The bifunctional aziridine curing agent may include at least one of N,N'-hexamethylene-1,6-bis(1-aziridinecarboxamide) and N,N'-diphenylmethane-4,4'-bis(1-aziridinecarboxamide).

The adhesive composition for polarizing plates according to an embodiment may include a small amount of the bifunctional aziridine curing agent to increase adhesive strength of the adhesive film for polarizing plates while improving reliability thereof. Even a small amount of the bifunctional aziridine curing agent in the (meth)acrylic copolymer can improve adhesive strength and reliability of the adhesive film. In an embodiment, the bifunctional aziridine curing agent may be present in an amount of about 0.001, 0.005, 0.01, 0.02, 0.03, 0.04, 0.05, 0.06, 0.07, 0.08, 0.09, or 0.10 parts by weight relative to 100 parts by weight of the (meth)acrylic copolymer. Further, the bifunctional aziridine curing agent may be present in an amount in a range from one of the numerical values set forth above to another numerical value set forth above relative to 100 parts by weight of the (meth)acrylic copolymer. For example, the bifunctional aziridine curing agent may be present in an amount of about 0.1 parts by weight or less, and, in one embodiment, about 0.001 parts by weight to about 0.1 parts by weight, and, in one embodiment, about 0.01 parts by weight to about 0.06 parts by weight, relative to 100 parts by weight of the (meth)acrylic copolymer. Within this range, the adhesive composition for polarizing plates can increase adhesive strength of the adhesive film for polarizing plates while improving reliability thereof.

The isocyanate curing agent can cure the adhesive composition through reaction with the hydroxyl group of the (meth)acrylic copolymer. The isocyanate curing agent may include a tri- or higher functional, and, in an embodiment, a tri- to hexa-functional isocyanate curing agent. In an embodiment, the isocyanate curing agent may include one of isocyanate monomers, such as trifunctional isocyanate curing agents including a trifunctional trimethylolpropane-modified toluene diisocyanate adduct, a trifunctional toluene diisocyanate trimer, and a trimethylolpropane-modified xylene diisocyanate adduct, a hexafunctional trimethylolpropane-modified toluene diisocyanate, a hexafunctional isocyanurate-modified toluene diisocyanate, tolylene diisocyanate, chlorophenylene diisocyanate, tetramethylene diisocyanate, xylylene diisocyanate, diphenylmethane diisocyanate, hydrogenated diphenylmethane diisocyanate, or isocyanate compounds produced by adding such isocyanate monomers to trimethylolpropane; and urethane prepolymer type isocyanates produced by addition reaction of isocyanurate compounds or biuret type compounds and polyether polyols, polyester polyols, acrylic polyols, polybutadiene polyols, polyisoprene polyols, and the like. These may be used alone or in combination thereof. In an embodiment, the isocyanate curing agent may be a trifunctional isocyanate curing agent. The isocyanate curing agent may be present in an amount of about 0.001, 0.005, 0.01, 0.05, 0.1, 0.2, 0.3, 0.4, 0.5, 0.6, 0.7, 0.8, 0.9, or 1.0 part by weight relative to 100 parts by weight of the (meth)acrylic copolymer. In addition, the isocyanate curing agent may be present in an amount in a range from one of the numerical values set forth above to another numerical value set forth above relative to 100 parts by weight of the (meth)acrylic copolymer. For example, the isocyanate curing agent may be present in an amount of about 1 part by weight or less, and, in one embodiment, about 0.001 parts by weight to about 1 part by weight, and, in one embodiment, about 0.01 parts by weight to about 0.5 parts by weight, relative to 100 parts by weight of the (meth)acrylic copolymer. Within this range, the adhesive composition can improve durability (e.g., thermal resistance) and peel strength.

The adhesive composition for polarizing plates may further include a silane coupling agent. The silane coupling agent can improve adhesive strength of the adhesive film for polarizing plates with respect to an adherend such as a glass plate. The silane coupling agent may include a typical silane coupling agent known to those skilled in the art. For example, the silane coupling agent may include at least one selected from the group consisting of epoxy structure-containing silicon compounds such as 3-glycidoxypropyltrimethoxysilane, 3-glycidoxypropylmethyldimethoxysilane, and 2-(3,4-epoxycyclohexyl)ethyltrimethoxysilane; polymerizable unsaturated group-containing silicon compounds such as vinyltrimethoxysilane, vinyltriethoxysilane, and (meth)acryloxypropyltrimethoxysilane; amino group-containing silicon compounds such as 3-aminopropyltrimethoxysilane, N-(2-aminoethyl)-3-aminopropyltrimethoxysilane, and N-(2-aminoethyl)-3-aminopropylmethyldimethoxysilane; mercapto group-containing silicon compounds such as γ-mercaptopropyltrimethoxysilane, γ-mercaptopropyltriethoxysilane, γ-mercaptobutyltrimethoxysilane, and γ-mercaptopropylmethyldimethoxysilane, without being limited thereto. The silane coupling agent may be present in an amount of about 0.1 parts by weight to about 5 parts by weight, and, in one embodiment, about 0.1 parts by weight to about 2 parts by weight, relative to 100 parts by weight of the (meth)acrylic copolymer. Within this range, the adhesive composition can secure good durability of the adhesive film, prevent or substantially prevent detachment of the adhesive film under moist resistance conditions, and provide less variation in properties such as peel strength over time. Particularly, the epoxy group or mercapto group-containing silane coupling agent can further improve such effects of the adhesive composition.

The adhesive composition for polarizing plates may further include at least one of a tackifier and an antistatic agent. The tackifier serves to improve adhesive strength of the adhesive film and may include any of tackifiers known to those skilled in the art. The antistatic agent serves to suppress static electricity upon removal of the adhesive film from an adherend and may include a quaternary ammonium antistatic agent. At least one of the tackifier and the antistatic agent may be present in an amount of about 0.1 parts by weight to about 2 parts by weight, and, in one embodiment, about 0.1 parts by weight to about 1 part by weight, relative to 100 parts by weight of the (meth)acrylic copolymer. Within this range, the tackifier or the antistatic agent can realize effects thereof without affecting the properties of the adhesive film.

The adhesive composition for polarizing plates may further include typical additives. The additives may include a UV absorbent, an antioxidant, an adhesion imparting resin, a plasticizer, a reworking agent, and/or the like. The additives may include a typical base oil known to those skilled in the art. The additives may be present in an amount of about 0.001 parts by weight to about 5 parts by weight, and, in one embodiment, about 0.01 parts by weight to about 1 part by weight, relative to 100 parts by weight of the (meth)acrylic copolymer. Within this range, the additives can realize effects thereof without affecting the properties of the adhesive film for polarizing plates.

The adhesive composition for polarizing plates may have a viscosity at about 25° C. of about 1,000 cPs to about 4,000 cPs. Within this range, the adhesive composition can facilitate thickness adjustment of the adhesive film, form an adhesive film without generating spots, provide a uniform or substantially uniform coating surface, and is suitable for rapid coating.

Next, a polarizing plate according to an embodiment of the invention will be described.

A polarizing plate according to an embodiment may include an adhesive film according to an embodiment of the present invention. The polarizing plate may be produced by attaching the adhesive film to a surface of the polarizing plate or by coating the adhesive composition according to an embodiment to a thickness (e.g., a predetermined thickness) on a surface of the polarizing plate.

The polarizing plate may include a polarizer and an optical film formed on at least one surface of the polarizer. The polarizer and the optical film may be selected from any polarizers and optical films known to those skilled in the art.

The polarizing plate may have a thickness of about 30 μm to about 250 μm, and, in one embodiment, about 140 μm to about 200 μm. Within this range, the polarizing plate can be used for an optical display.

Figure 2:
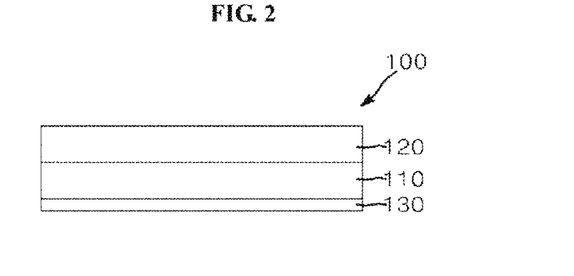
FIG. 2 is a sectional view of a polarizing plate according to an embodiment of the present invention.

FIG. 2 is a sectional view of a polarizing plate according to an embodiment of the present invention. Referring to FIG. 2, a polarizing plate 100 according to an embodiment includes a polarizer 110, a first optical film 120 formed on an upper surface of the polarizer 110, and an adhesive film 130 formed on a lower surface of the polarizer 110, wherein the adhesive film 130 may include the adhesive film for polarizing plates according to an embodiment of the present invention. Although not shown in FIG. 2, the adhesive film 130 may be attached to a liquid crystal display panel.

The polarizer 110 may be formed of any polyvinyl alcohol film without being limited to a particular production method. For example, the polarizer may be produced using a modified polyvinyl alcohol film, such as a partially formalized polyvinyl alcohol film, an acetoacetyl group-modified polyvinyl alcohol film, and/or the like. In an embodiment, the polarizer is produced by dyeing a polyvinyl alcohol film with iodine or dichroic dyes, followed by stretching the polyvinyl alcohol film in a certain direction. In an embodiment, the polarizer is produced through swelling, dyeing, and stretching processes. A method of performing each of the processes is generally known to those skilled in the art. The polarizer 110 may have a thickness of about 5 μm to about 50 μm. Within this range, the polarizer 110 can be used in optical displays.

The first optical film 120 may be formed of an optically transparent resin, such as at least one of cyclic polyolefin including amorphous cyclic olefin polymer (COP) and the like, poly(meth)acrylate, polycarbonate, polyester including polyethylene terephthalate (PET) and the like, cellulose ester including triacetylcellulose (TAC) and the like, polyethersulfone, polysulfone, polyimide, polyimide, polyolefin, polyarylate, polyvinyl alcohol, polyvinyl chloride, and polyvinylidene chloride resins. The first optical film 120 may have a thickness of about 10 μm to about 200 μm, for example, about 20 μm to about 120 μm. Within this range, the first optical film 120 can be used for an optical display.

Figure 3:
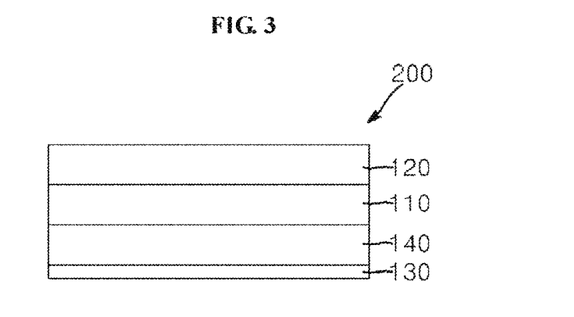
FIG. 3 is a sectional view of a polarizing plate according to another embodiment of the present invention.

FIG. 3 is a sectional view of a polarizing plate according to another embodiment of the present invention. Referring to FIG. 3, a polarizing plate 200 according to another embodiment may include a polarizer 110, a first optical film 120 formed on an upper surface of the polarizer 110, a second optical film 140 formed on a lower surface of the polarizer 110, and an adhesive film 130 formed on a lower surface of the second optical film 140, wherein the adhesive film 130 may include the adhesive film for polarizing plates according to an embodiment of the present invention. The polarizing plate 200 is substantially the same as the polarizing plate 100 described above except that the second optical film 140 is further formed between the polarizer 110 and the adhesive film 130. The second optical film 140 may be formed of a resin which is the same as or different from that of the first optical film 120. The second optical film 140 may have a thickness which is equal to or different from that of the first optical film 120.

Although not shown in FIGS. 2 and 3, a bonding layer formed of a bonding agent for polarizing plates may be formed between the polarizer and the first optical film and/or between the polarizer and the second optical film. The bonding agent may include water-based, pressure-sensitive, and/or UV curable bonding agents.

An optical display according to an embodiment may include the polarizing plate according to an embodiment the present invention. For example, the optical display may include any of a liquid crystal display and an organic light emitting display, without being limited thereto.

Figure 4:
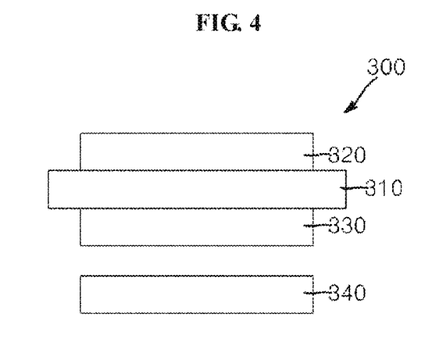
FIG. 4 is a sectional view of a liquid crystal display according to an embodiment of the present invention.

FIG. 4 is a sectional view of a liquid crystal display according to an embodiment of the present invention. Referring to FIG. 4, a liquid crystal display 300 according to an embodiment may include a liquid crystal display panel 310, a first polarizing plate 320 formed on an upper surface of the liquid crystal display panel 310, a second polarizing plate 330 formed on a lower surface of the liquid crystal display panel 310, and a backlight unit 340 disposed under the second polarizing plate 330, wherein at least one of the first and second polarizing plates 320, 330 may include the polarizing plate according to an embodiment of the present invention.

The liquid crystal display panel may employ a twisted nematic (TN) mode, a vertical alignment (VA) mode, a patterned vertical alignment (PVA) mode, or a super-patterned vertical alignment (S-PVA) mode. In particular, a TN mode liquid crystal display panel can have an excellent effect on prevention of light leakage.

Next, the present invention will be described in more detail with reference to some examples. It should be understood that these examples are provided for illustration only and are not to be construed in any way as limiting the present invention.

Details of components used in Examples and Comparative Examples are as follows.

(A) (Meth)acrylic copolymer: (Meth)acrylic copolymer prepared in Preparative Example 1

(B1) Bifunctional aziridine curing agent: PZH-100 (N,N'-hexamethylene 1,6-bis(2-methyl-1-Aziridinecarboxamide), solid content: 6.5 wt %, MENADIONA)

(B2) Trifunctional aziridine curing agent: CL-467 (trimethylolpropane tris(2-methyl-1-aziridinepropionate), solid content: 100 wt %, MENADIONA)

(B3) Trifunctional aziridine curing agent: CL-427 (Pentaerythritol-tris-(β-(N-aziridinyW)propionate, solid content: 100 wt %, MENADIONA)

(B4) Isocyanate curing agent: HARDENER AL (solid content: 45 wt %, Nippon Polyurethane)

(B5) Metal chelate curing agent: BXX-4805 (solid content: 10 wt %, Toyo Ink Co., Ltd.)

(C) Silane coupling agent (C1) Silane coupling agent: Additive S-1 (solid content: 10 wt %, Saiden Chemical Industry Co., Ltd.)

(C2) Silane coupling agent: KBM-403 (solid content: 100 wt %, Shin-Etsu Chemical Co., Ltd.)

(D) Thermoinitiator: BPO (benzoyl peroxide, solid content: 100 wt %, Daejung Chemicals & Metals Co., Ltd.)

PREPARATIVE EXAMPLE 1

In a 1 L reactor provided with a cooler to facilitate temperature adjustment while purging with nitrogen, a monomer mixture including 63 parts by weight of n-butyl acrylate (BA), 34 parts by weight of methyl acrylate (MA), 1 part by weight of 2-hydroxyethyl methacrylate (2-HEMA) and 2 parts by weight of acrylic acid (AA) was prepared. As a solvent, 100 parts by weight of ethyl acetate was added to the mixture. Then, nitrogen gas was supplied to the reactor for 1 hour to remove oxygen from the reactor, which in turn was maintained at 62° C. After uniformly stirring the monomer mixture, 0.07 parts by weight of azobisisobutyronitrile (AIBN) was added as an initiator to the reactor, followed by reaction for 8 hours, thereby preparing a (meth)acrylic copolymer (weight average molecular weight: 800,000 to 1,100,000, PDI: 4.0, glass transition temperature: −31° C.).

EXAMPLE 1

(A) An adhesive composition for polarizing plates was prepared by mixing 100 parts by weight of the acrylic copolymer prepared in Preparative Example 1, 0.43 parts by weight of the bifunctional aziridine curing agent (B1) (the bifunctional aziridine curing agent was added in an amount of 0.028 parts by weight in terms of solid content), 0.3 parts by weight of the isocyanate curing agent (B4) (the isocyanate curing agent was added in an amount of 0.135 parts by weight in terms of solid content), and 3.4 parts by weight of the silane coupling agent (C1) (the silane coupling agent was added in an amount of 0.34 parts by weight in terms of solid content), and diluting the mixture with methylethylketone to a concentration of 20%, followed by stirring for 30 minutes.

The prepared adhesive composition was coated onto a release film and dried at 90° C. for 4 minutes to form a 21 μm thick adhesive layer. The adhesive layer was subjected to aging at room temperature and constant humidity conditions (23° C., 45% RH), thereby preparing an adhesive film for polarizing plates.

EXAMPLE 2 to EXAMPLE 6

Adhesive films for polarizing plates were prepared in the same manner as in Example 1 except that each adhesive composition was changed as listed in Table 1 (unit: parts by weight).

COMPARATIVE EXAMPLE 1 to Comparative Example 5

Adhesive films for polarizing plates were prepared in the same manner as in Example 1 except that each adhesive composition was changed as listed in Table 2 (unit: parts by weight).

In Tables 1 and 2, the amounts of the curing agent and the silane coupling agent in each of the adhesive compositions were determined in consideration of the solid content of the corresponding products.

The adhesive compositions and the adhesive films of the Examples and Comparative Examples were evaluated as to the following properties. Evaluation results are shown in Tables 1 and 2.

(1) Adhesive strength 1: Each of the adhesive compositions prepared in the Examples and Comparative Examples was coated onto one surface of a release film (RPK501, thickness: 38 μm, Toray Advanced Material Co., Ltd.) to form an adhesive layer having a dry thickness of 21 μm, followed by drying in a chamber at 90° C. for 4 minutes, thereby preparing a stack of the release film/adhesive layer. A polarizing plate having a triple-layer structure of PET (polyethylene terephthalate) film (thickness: 100 μm)/polarizer (thickness: 22 μm)/COP (cyclic olefin polymer) film (thickness: 40 μm) stacked in the stated order was prepared. Each of the adhesive films prepared in the Examples and Comparative Examples was attached to the COP film of the polarizing plate and left at 23° C. and RH 45% for 1 day, and the release film was removed to expose the adhesive layer, which in turn was subjected to corona treatment once using a corona treatment apparatus (grade name: NW-HSPS3002, Naoplasma Co., Ltd.) at 60 doses. A PET film (TA044, thickness: 100 μm, TOYOBO Co., Ltd) was also subjected to corona treatment under the same conditions. A corona-treated surface of the corona-treated PET film was attached to the corona-treated adhesive layer, and left at 25° C. for 1 day, thereby preparing a specimen (25×180 mm) having a stack structure of PET film/polarizer/COP film/corona-treated adhesive layer/corona-treated PET film, as shown in FIG. 1.

With the corona-treated surface of the PET film of the specimen secured to an alkali-free glass plate via a double-sided tape, the corona-treated adhesive layer and the corona-treated PET film of the specimen were coupled to upper and lower jigs of a Texture Analyzer, a load was measured upon peeling the corona-treated adhesive layer from the corona-treated PET film at about 180° and at a tensile speed of about 300 mm/min under a load cell of 30 kgf.

(2) Adhesive strength 2: A specimen was prepared similarly to that described as in (1) except that it was left at 25° C. for 7 days, followed by measuring adhesive strength in the same manner.

(3) Peel strength: Each of the adhesive compositions prepared in the Examples and Comparative Examples was coated and dried on a glass plate, followed by aging at 23° C. and RH 45% for 1 day, thereby preparing a specimen of the adhesive film (24 mm×200 mm) attached to the glass plate. Peel strength was measured under 180° peeling force in accordance with JIS 2107. With the adhesive film and the glass plate of the specimen coupled to upper and lower jigs of a Texture Analyzer, a load was measured upon peeling the adhesive film from the glass plate at about 180° and at a tensile speed of about 300 mm/min under a load cell of 30 kgf.

(4) Creep 1: Creep of an adhesive layer immediately after drying was measured using a Texture Analyzer TA.XT PLUS (load cell 5 kg, EKO Instruments).

Referring to FIG. 5, the specimen 23 for measurement of creep was prepared by attaching the adhesive film 21 to the polarizing plate 22. The polarizing plate 22 was prepared by sequentially stacking a 40 μm thick triacetylcellulose film, a 5 μm thick polarizer, and a 40 μm thick triacetylcellulose film in the stated order. Here, the adhesive layer was prepared by coating each of the adhesive compositions of the Examples and Comparative Examples to a thickness of 20 μm, followed by drying at 90° C. for 4 minutes. The specimen was attached in an area of a×b (for example, 15 mm×15 mm) to a distal end of the soda lime glass plate 20 and pulled by the weight W of 2,250 g at 23° C. for 1,000 seconds, followed by measuring a pushed distance of the specimen 23 from the glass plate 20. In measurement of creep for 1,000 seconds, a creep exceeding 1,000 μm was represented by slip.

(5) Creep 2: Creep was measured in the same manner as in (4) with respect to a 20 μm thick adhesive layer, which was formed by coating and drying each of the adhesive compositions prepared in the Examples and Comparative Examples, followed by aging at 23° C. and RH 45% for 1 day.

(6) Gel fraction: Each of the adhesive compositions prepared in the Examples and Comparative Examples was coated on one surface of a release film to form an adhesive layer having a dry thickness of 21 μm. For measurement of gel fraction, 0.5 g of an adhesive layer subjected to aging at 23° C. and RH 55% for a predetermined period of time was wrapped with an iron mesh (200 mesh) (Wa), the weight of which was previously measured, so as to prevent leakage of the adhesive layer therefrom, and the total weight of the adhesive layer and the iron mesh was measured and then placed in a sample bottle. With the sample bottle filled with 50 cc methylethylketone, the iron mesh and the adhesive layer were completely dipped in methylethylketone within the bottle and left at 23° C. for 1 day, followed by drying at 100° C. for 12 hours. Then, the total weight of the iron mesh and the adhesive layer was measured. Finally, a gel fraction of the adhesive layer was obtained by Equation 2. Aging was performed for 1 day or 7 days.

(7) Gel fraction difference: Gel fraction difference was calculated by Equation 1 after measuring the gel fraction as in (6). A gel fraction difference of 5% or less indicated that aging was completed for an aging period of 1 day.

(8) Viscosity variation: An initial viscosity (C) of each of the adhesive compositions of the Examples and Comparative Examples and viscosity (D) thereof after the adhesive composition was left at 25° C. for 24 hours were measured. Viscosity of the adhesive composition was measured at 25° C. using an LV-type Brookfield viscometer. A viscosity variation ratio (Δn) was calculated by Equation 3. Δn of less than 10% was rated as ○, Δn of 10% to less than 20% was rated as Δ, and Δn of 20% or greater was rated as x.

(9) Durability: Each of polarizing plates (100 mm×80 mm) including the adhesive films prepared in the Examples and Comparative Examples was attached to a glass plate via the adhesive film and compressed under a pressure of 4 to 5 kg/cm$^2$ to prepare specimens. Some specimens were left at 60° C. and 95% RH for 250 hours in order to evaluate moisture resistance. Some specimens were left at 85° C. for 250 hours in order to evaluate thermal resistance. When observed with the naked eye, no bubbles on the adhesive film or no detachment between the adhesive film and the polarizing plate was rated as ○, slight bubble generation or detachment was rated as Δ, and significant bubble generation or detachment was rated as x.

TABLE 1

| | | Example 1 | Example 2 | Example 3 | Example 4 | Example 5 | Example 6 |
|---|---|---|---|---|---|---|---|
| (A) | | 100 | 100 | 100 | 100 | 100 | 100 |
| (B) | (B1) | 0.028 | 0.035 | 0.042 | 0.028 | 0.035 | 0.028 |
| | (B4) | 0.135 | 0.135 | 0.135 | 0.135 | 0.135 | 0.09 |
| (C) | (C1) | 0.34 | 0.34 | 0.34 | — | — | 1.25 |
| | (C2) | — | — | — | 0.1 | 0.1 | — |
| Adhesive strength 1 (gf/25 mm) | 1 day | 3102 | 3029 | 2953 | 3085 | 3002 | 2564 |
| Adhesive strength 2 (gf/25 mm) | 7 days | 3321 | 3203 | 3209 | 3115 | 3129 | 2789 |
| Peel strength (gf/25 mm) | | 225 | 200 | 174 | 303 | 284 | 120 |
| Creep 1 ($\mu$m) | After drying of coating | slip | slip | slip | slip | slip | slip |
| Creep 2 ($\mu$m) | 1 day | 220 | 192 | 165 | 215 | 187 | 234 |
| Gel fraction (%) | 1 day | 72.1 | 75.6 | 79.3 | 71.8 | 74.1 | 73.2 |
| | 7 days | 73.2 | 76.9 | 80.7 | 73.7 | 75.5 | 75.1 |
| Gel fraction difference (%) | | 1.1 | 1.3 | 1.4 | 1.9 | 1.4 | 1.9 |
| Viscosity variation | | ○ | ○ | ○ | ○ | ○ | ○ |
| Durability | Thermal resistance | ○ | ○ | ○ | ○ | ○ | ○ |
| | Moisture resistance | ○ | ○ | ○ | ○ | ○ | ○ |

TABLE 2

| | | Comparative Example 1 | Comparative Example 2 | Comparative Example 3 | Comparative Example 4 | Comparative Example 5 |
|---|---|---|---|---|---|---|
| (A) | | 100 | 100 | 100 | 100 | 100 |
| (B) | (B1) | — | — | — | — | 0.028 |
| | (B2) | 0.025 | — | — | — | — |
| | (B3) | — | 0.025 | — | — | — |
| | (B4) | 0.135 | 0.135 | 0.135 | 0.135 | — |
| | (B5) | — | — | 1.0 | — | — |
| (C) | (C1) | 0.34 | 0.34 | 0.34 | 0.34 | 0.34 |
| | (C2) | — | — | — | — | — |
| (D) | | — | — | — | 0.12 | — |
| Adhesive strength 1 (gf/25 mm) | | 2318 | 1881 | 2109 | 1875 | 2702 |
| Adhesive strength 2 (gf/25 mm) | | 2405 | 1900 | 2213 | 1951 | 2798 |
| Peel strength (gf/25 mm) | | 396 | 52 | 280 | 345 | 82 |
| Creep 1 ($\mu$m) | | 426 | 274 | slip | 316 | slip |
| Creep 2 ($\mu$m) | | 150 | 110 | 206 | 181 | 270 |
| Gel fraction (%) | 1 day | 81.4 | 85.6 | 65.2 | 70.6 | 70.1 |
| | 7 days | 83.3 | 87.2 | 67.2 | 72.3 | 71.3 |
| Gel fraction difference (%) | | 1.9 | 1.6 | 2.0 | 1.7 | 1.2 |
| Viscosity variation | | Δ | x | ○ | ○ | ○ |
| Durability | Thermal resistance | x | x | Δ | ○ | x |
| | Moisture resistance | ○ | ○ | ○ | Δ | ○ |

As can be seen from Table 1, the adhesive films of the Examples exhibited high adhesive strength and good durability. In addition, the adhesive films of the Examples exhibited no variation in adhesive strength even after a predetermined period of time. Further, the adhesive compositions of the Examples had a low gel fraction difference and thus could be advantageously used for an adhesive film even after aging for 1 day, and had low viscosity variation to secure good storage stability. Furthermore, although the adhesive compositions of the Examples had a large creep value immediately after drying of the coating layer, the adhesive compositions had significant reduction in creep after aging at room temperature for 1 day, thereby providing an excellent effect of reducing the aging period at room temperature.

Conversely, as shown in Table 2, the adhesive films of Comparative Examples 1 to 3 including the trifunctional aziridine curing agent or the metal chelate curing agent had low adhesive strength or poor thermal resistance. The adhesive films of Comparative Examples 4 and 5 including the isocyanate curing agent or the bifunctional aziridine curing agent alone had low adhesive strength or poor thermal resistance and low peel strength. The adhesive films of Comparative Examples 1, 2, and 4 had low creep immediately after drying of the coating layer to provide poor wettability and had poor external appearance due to generation of bubbles when attached to the polarizing plate.

It should be understood that various modifications, changes, alterations, and equivalent embodiments can be made by those skilled in the art without departing from the spirit and scope of the invention.

Some example embodiments have been disclosed herein, and although specific terms are employed, they are used and are to be interpreted in a generic and descriptive sense only and not for purpose of limitation. In some instances, as would be apparent to one of ordinary skill in the art at the time of filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An adhesive film for polarizing plates formed of an adhesive composition comprising: a (meth)acrylic copolymer including a hydroxyl group and a carboxyl group; and curing agent consisting of a bifunctional aziridine curing agent and a trifunctional isocyanate curing agent, wherein the bifunctional aziridine curing agent is at least one of N,N'-hexamethylene-1,6-bis(1-aziridinecarboxamide) and N,N'-diphenylmethane-4,4'-bis(1-aziridinecarboxamide), the adhesive film having an adhesive strength satisfying the equation:

AS1≥about 2,500 gf/25 mm, where AS1 is a load upon peeling a corona-treated PET film of a specimen from a corona-treated adhesive layer thereof at 180° and at a tensile speed of 300 mm/min, in which the specimen is prepared by sequentially stacking a PET film, a polarizer, a cyclic olefin polymer (COP) film, an adhesive layer formed by corona treatment of the adhesive film, and a corona-treated PET film and left at 25° C. for 1 day.

2. The adhesive film for polarizing plates according to claim 1, wherein the adhesive film satisfies the equation:

AS7−AS1 about 500 gf/25 mm, where AS7 is a load upon peeling a corona-treated PET film of a specimen from a corona-treated adhesive layer thereof at 180° and at a tensile speed of 300 mm/min, in which the specimen is prepared by sequentially stacking a PET film, a polarizer, a cyclic olefin polymer (COP) film, an adhesive layer formed by corona treatment of the adhesive film, and a corona-treated PET film and left at 25° C. for 7 days.

3. The adhesive film for polarizing plates according to claim 1, wherein the adhesive film has a peel strength of about 100 gf/25 mm to about 500 gf/25 mm, as measured in accordance with JIS 2107.

4. The adhesive film for polarizing plates according to claim 1, wherein the (meth)acrylic copolymer is a copolymer of a monomer mixture comprising a hydroxyl group-containing (meth)acrylic monomer, a carboxyl group-containing (meth)acrylic monomer, and an alkyl group-containing (meth)acrylic monomer.

5. The adhesive film for polarizing plates according to claim 4, wherein the alkyl group-containing (meth)acrylic monomer comprises a first alkyl group-containing (meth)acrylic monomer, a homopolymer of which has a glass transition temperature of about -10° C. to about -100° C., and a second alkyl group-containing (meth)acrylic monomer, a homopolymer of which has a glass transition temperature of about 5° C. to about 100° C.

6. The adhesive film for polarizing plates according to claim 4, wherein the hydroxyl group-containing monomer is present in a lesser amount than the carboxyl group-containing monomer in the monomer mixture.

7. The adhesive film for polarizing plates according to claim 1, wherein the bifunctional aziridine curing agent is present in an amount of about 0.1 parts by weight or less relative to 100 parts by weight of the (meth)acrylic copolymer.

8. The adhesive film for polarizing plates according to claim 1, wherein the isocyanate curing agent is present in an amount of about 1 part by weight or less relative to 100 parts by weight of the (meth)acrylic copolymer.

9. An adhesive composition for polarizing plates, the adhesive composition comprising: a (meth)acrylic copolymer having a hydroxyl group and a carboxyl group; and curing agent consisting of a bifunctional aziridine curing agent and a trifunctional isocyanate curing agent, wherein the bifunctional aziridine curing agent is at least one of N,N'-hexamethylene-1,6-bis(1-aziridinecarboxamide) and N,N'-diphenylmethane-4,4'-bis(1-aziridinecarboxamide), wherein the (meth)acrylic copolymer is a copolymer of a monomer mixture comprising a hydroxyl group-containing (meth)acrylic monomer, a carboxyl group-containing (meth)acrylic monomer, and an alkyl group-containing (meth)acrylic monomer, the adhesive composition having a gel fraction difference of about 5% or less as calculated by the equation:

Gel fraction difference =A−B, where A is a gel fraction of the adhesive composition for polarizing plates after aging for 7 days, and B is a gel fraction of the adhesive composition for polarizing plates after aging for 1 day, as calculated by the equation:

Gel fraction=(Wb−Wa)/(Wc−Wa)×100, where Wa is a weight of a wire mesh of about 200 mesh; Wb is a total weight in grams of the wire mesh and about 0.5 g of an adhesive film wrapped by the wire mesh so as not to leak therefrom, in which the adhesive film is obtained by aging the adhesive composition at about 23° C. and 55% RH for a period of time; and Wc is a total weight in grams of the wire mesh and the adhesive film, in which the adhesive film wrapped by the wire mesh is completely dipped in a sample bottle containing 50 cc methylethylketone, left at about 23° C. for about 1 day, and dried at about 100° C. for about 12 hours, wherein an adhesive film formed of the adhesive composition having an adhesive strength satisfying the equation:
AS1 ≥about 2,500 of/25 mm, where AS1 is a load upon peeling a corona-treated PET film of a specimen from a corona-treated adhesive layer thereof at 180° and at a tensile speed of 300 mm/min, in which the specimen is prepared by sequentially stacking a PET film, a polarizer, a cyclic olefin polymer (COP) film, an adhesive layer formed by corona treatment of the adhesive film, and a corona-treated PET film and left at 25° C. for 1 day.

10. The adhesive composition for polarizing plates according to claim 9, wherein the adhesive composition has a viscosity variation ratio of less than about 10%, as calculated by the equation:

Viscosity variation ratio=(D−C)/C×100, where C is an initial viscosity in cPs of the adhesive composition at about 25° C., and D is a viscosity in cPs of the adhesive composition at 25° C., as measured after the adhesive composition is left at about 25° C. for about 24 hours.

11. The adhesive composition for polarizing plates according to claim 9, wherein the adhesive composition has a creep at about 23° C. of about 1,000 µm or greater after drying of a coating layer thereof.

12. The adhesive composition for polarizing plates according to claim 9, wherein the adhesive composition has a creep at about 23° C. of about 300 µm or less, as measured after aging at about 23° C. and about 55% RH for about 1 day.

13. The adhesive composition for polarizing plates according to claim 9, wherein the alkyl group-containing (meth)acrylic monomer comprises a first alkyl group-containing (meth)acrylic monomer, a homopolymer of which has a glass transition temperature of about −10° C. to about −100° C., and a second alkyl group-containing (meth)acrylic monomer, a homopolymer of which has a glass transition temperature of about 5° C. to about 100° C.

14. The adhesive composition for polarizing plates according to claim 9, wherein the bifunctional aziridine curing agent is present in an amount of about 0.1 parts by weight or less relative to 100 parts by weight of the (meth)acrylic copolymer, and the isocyanate curing agent is present in an amount of about 1 part by weight or less relative to 100 parts by weight of the (meth)acrylic copolymer.

15. A polarizing plate comprising the adhesive film for polarizing plates according to claim 1.

16. An optical display comprising the polarizing plate according to claim 15.

17. A polarizing plate comprising the adhesive film formed of the adhesive composition for polarizing plates according to claim 9.

18. An optical display comprising the polarizing plate according to claim 17.

* * * * *